United States Patent

Mazzoni

[11] Patent Number: 6,012,677
[45] Date of Patent: Jan. 11, 2000

[54] CAGE-CHAIR WHICH MAY BE COUPLED TO HELICOPTERS TO PERFORM CONSTRUCTION AND MAINTENANCE SERVICES IN HIGH VOLTAGE TOWERS AND LINES

[76] Inventor: Carlos Mazzoni, Rau Antonio do Campo 345, Santo Amaro, Sao Paulo, Brazil

[21] Appl. No.: 08/491,404

[22] Filed: Jun. 19, 1995

[30] Foreign Application Priority Data

Oct. 7, 1994 [BR] Brazil ..................................... 9404022

[51] Int. Cl.[7] .................................................... B64D 9/00
[52] U.S. Cl. ................................... 244/118.1; 244/118.5; 244/118.6; 182/150; 182/222
[58] Field of Search .............................. 244/118.1, 118.5, 244/118.6; 297/411.41, 411.42, 447.2, 445.1; 182/150, 222

[56] References Cited

U.S. PATENT DOCUMENTS

| | | | |
|---|---|---|---|
| 3,863,736 | 2/1975 | McWilliams | 182/150 |
| 4,637,575 | 1/1987 | Yenzer | 244/118.1 |
| 4,673,059 | 6/1987 | Kurtgis | 182/150 |
| 5,295,557 | 3/1994 | Taylor | 182/222 |
| 5,328,133 | 7/1994 | Charest et al. | 244/118.1 |

*Primary Examiner*—Michael J. Carone
*Assistant Examiner*—Tien Dinh
*Attorney, Agent, or Firm*—Steinberg & Raskin, P.C.

[57] ABSTRACT

A chair-cage adapted to be coupled to a helicopter and used in construction and maintenance of high tension electricity towers and/or lines including a tubular support structure having a first substantially semi-circular tube, first horizontal support bars extending between two locations on the first tube, a horizontal crossbar extending between the first horizontal support bars for connecting the same and a veneer extending over the first tube, the first horizontal support bars and the horizontal crossbar. The chair-cage also includes first vertical bars each extending from an edge of a respective first horizontal support bar, a second substantially semi-circular tube spaced from the first tube and shaped to form a protection bow for the operator, a second horizontal bar connected to and extending between the first vertical bars, second vertical bars each extending from an end region of the horizontal crossbar, third horizontal bars each connected to a respective first vertical bar and a respective second vertical bar, and a stool mounted above locations at which the second vertical bars and third horizontal bars are connected to one another.

11 Claims, 2 Drawing Sheets

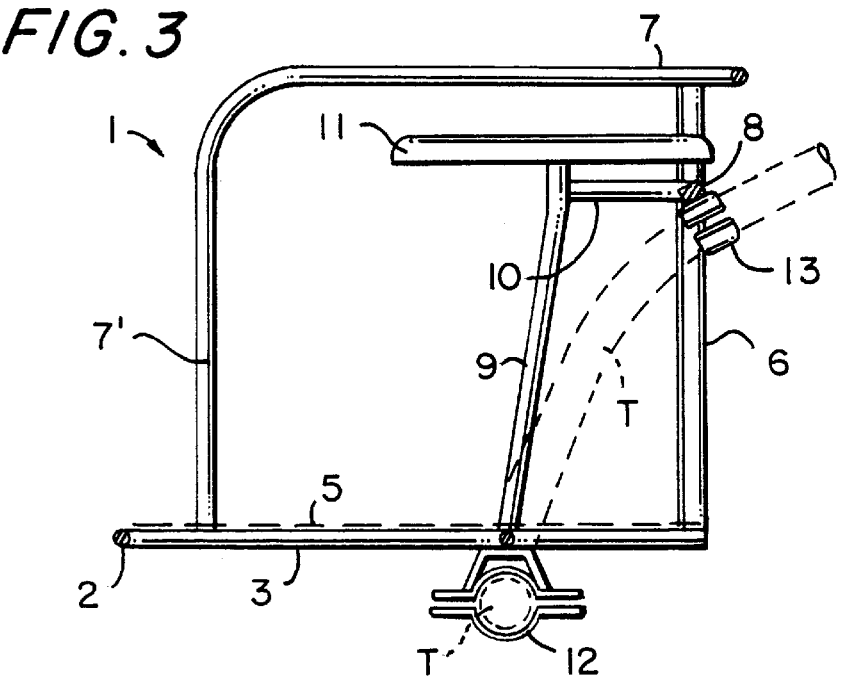
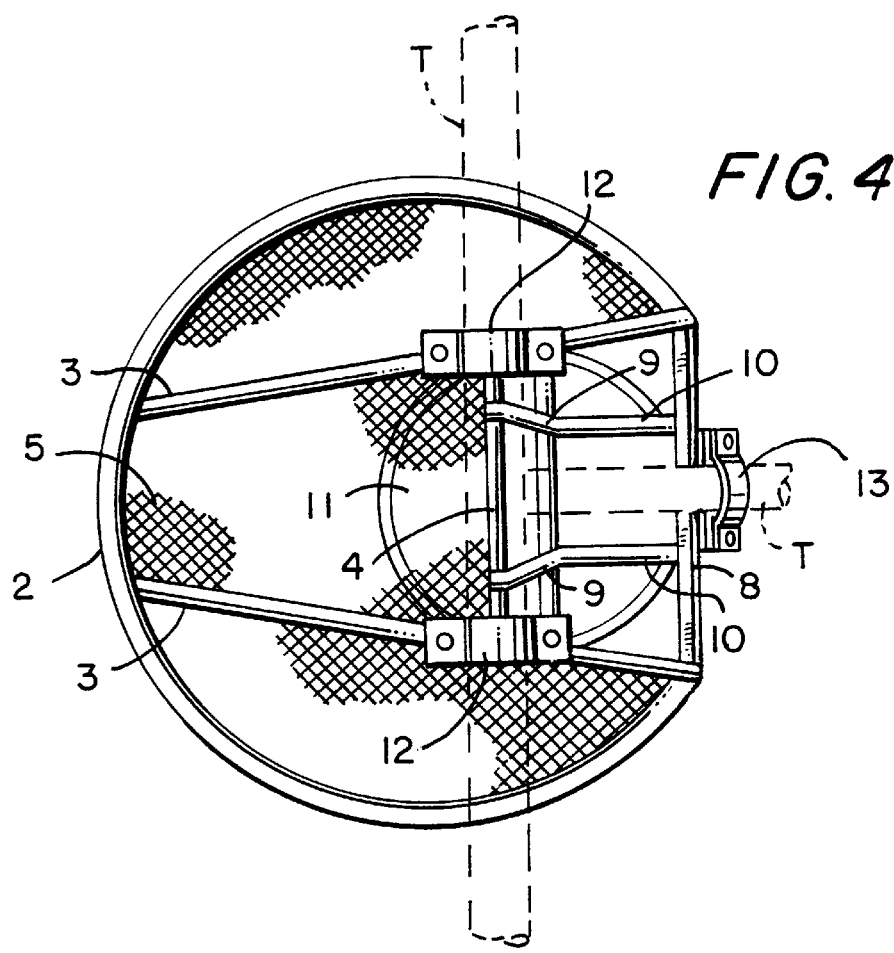

cage-chair which may be coupled to helicopters to perform construction and maintenance services in high voltage towers and lines

FIELD OF THE INVENTION

The present invention relates to a chair-cage adapted to be coupled to a helicopter in order to be used in the construction and maintenance of high tension electricity towers and/or lines, and more particularly, to a chair-cage that allows an operator sitting therein to do cleaning and repair services, substitution or installation of any equipment in high tension towers or lines in a completely safe manner.

BACKGROUND OF THE INVENTION

Until now, in view of the generation of electric fields in high tension electricity lines, the performance of construction and maintenance services on such lines, such as cleaning and repair services, substitution or installation of any equipment, has been very difficult.

One safe way to perform these services is to turn the electrical power off putting the installations and the lines out of service. However, this may result in economic loss to the consumers and is not always feasible or possible, and even if possible, it will undoubtedly cause serious operational difficulties to the consumers.

Additionally, in particular cases such as when the lines traverse a river or other waterway, it is not possible to perform the desired services even if the electricity is disconnected.

One manner to perform maintenance and repair servicing of high tension electricity lines without any interruption of the electricity is to provide the operator performing the servicing with electrically conductive equipment (e.g., conductive clothes, gloves, stockings and boots). With such equipment, the operator may be in contact with the energized high tension wire and will consequently maintain the same potential as the line. The operator after climbing the tower, may travel along the line using insulated canes, hooks and other appropriate fixing elements. It is a drawback that this method is quite slow and carries a certain risk to the operator when he pass from the neutral pole (the tower) through the high tension positive pole (the wires) and requires the operator to be in almost perfect physical condition.

Another way to perform maintenance and repair services in high tension towers and wires entails positioning the operator, equipped with electrically conductive clothes, inside a cabin suspendable by a crane or similar suspension device, raising the cabin via a crane, and placing it adjacent to the line to be repaired. The cabin is electrically connected to the line thereby providing no potential difference between cabin and the operator. Likewise, the crane would be isolated from earth and equally electrically connected to the line so that in the same way, there is no potential difference. It is a disadvantage of this method that many times, the maintenance services are to be performed in remote areas where access to vehicles, like cranes and other similar equipment, is not available. Furthermore, this method entails severe risks to the operator if the isolation/insulation between the equipment and the ground fails or is insufficient.

Recently, a technique has been developed which uses a helicopter provided with a platform to carry the operator directly to the place where the repair or maintenance services are required, e.g., in the tower or the high tension line. In this case, the platform is mounted directly to the helicopter landing gear and is electrically connected to it. The operator wears electrically conductive equipment which is electrically connected to the platform. The helicopter carries the operator to the line to be repaired, and stays adjacent to it in a "repair position". The operator is coupled by himself to the power line so that the line, the operator, the platform and the helicopter maintain the same potential. Additionally, the pilot of the helicopter wears electrically conductive equipment which is suitably connected to the helicopter.

In this case, since all of the elements are connected to one another and are at the same potential, when the helicopter stops in the air, there is no electric path through the earth and consequently there is no risk of any electrical discharge over the operator, who is thus able to perform the maintenance services calmly and safely.

At the present time, there exist cabins arranged on the edges of a structure mounted in the helicopter which carry the operator until he or she is positioned on or close to the high tension line to be repaired. These cabins are able to be additionally transferred to the high tension line through appropriate sheaves. In this manner, the maintenance service could be performed when the helicopter is proximate to the high tension line, or the cabin may be transferred to the line and then uncoupled from the helicopter's structure, allowing the helicopter to separate itself from the high tension line and to perform other tasks while the operator is performing the maintenance services on the line. When this operation is finished, the helicopter comes back and the cabin is hooked again at the edge of the structure mounted in the helicopter and uncoupled from the high tension line.

OBJECTS AND SUMMARY OF THE INVENTION

It is an object of the present invention to provide a new and improved method to perform maintenance and repair services on high tension lines and towers which carry such lines.

It is another object of the present invention to provide a new and improved method to perform maintenance and repair services on high tension lines and towers which carry such lines in which the drawbacks and disadvantages of the prior art methods are overcome and substantially eliminated.

It is still another object of the present invention to provide a new and improved method to perform maintenance and repair services on high tension lines and towers which carry such lines using a helicopter.

In order to achieve these objects and others, in accordance with the invention, a chair-cage is constructed to be adapted to be coupled to a helicopter and as such, to be used in the construction, repair and maintenance of high tension towers and/or lines. The chair-cage in accordance with the invention includes a tubular support structure coupled at three points to the landing gear of an helicopter and which has a seat for the operator. A counterweight is arranged on the opposite side of the helicopter from the chair-cage to balance both sides of the helicopter, this counterweight being able to have different weights according with the operator's weight.

The shape of the seat is based on the "Faraday's Cage" theory, providing the operator with full electrical protection and, at the same time, transmitting more safe sensation to him. Additionally, of the three fixing points of the chair-cage to the helicopter's landing gear, the operator remains secured to the helicopter by a safety belt which even gives him more protection.

The chair-cage in accordance with the invention supplies more comfort to the operator, since it allows him or her to work standing up or sitting, according to the needs of the situation. Additionally, the chair-cage is provided by an opening oriented outside, to the line to be repaired, this opening allowing the operator to perform the service with his body somewhat inclined out of the cage since this position is often necessary many times in certain kinds of repairs. The opening allows the operator to go in and out of the cage and an easy movement to the high tension wires using the appropriate equipment for unhooking the cage from the wires.

Finally, the chair-cage in accordance with the invention is, in view of its simple construction, easy to construct and, consequently, the cost of manufacture is substantially low.

Briefly, the chair-cage adapted to be coupled to a helicopter and used in construction and maintenance of high tension electricity towers and/or lines in accordance with the invention comprises a tubular support structure including a first substantially semi-circular tube, first horizontal support bars extending between two locations on the first tube, a horizontal crossbar extending between the first horizontal support bars for connecting the first horizontal support bars, a veneer extending over the first tube, the first horizontal support bars and the horizontal crossbar, first vertical bars each extending from an edge of a respective one of the first horizontal support bars, a second substantially semi-circular tube spaced from the first tube and shaped to form a protection bow, a second horizontal bar connected to and extending between the first vertical bars, second vertical bars each extending from an end region of the horizontal crossbar, third horizontal bars each connected to a respective first vertical bar and a respective second vertical bar, and a stool mounted above locations at which the second vertical bars and the third horizontal bars are connected to one another. The second tube has front portions oriented downward toward the first tube and front edges on the front portions connected to the first tube. Attachment means such as clamps may be arranged on the tubular support structure for attaching the tubular support structure to the helicopter, e.g., to a landing gear of the helicopter. The clamps may comprise first and second clamps connected to a respective first horizontal support bar and a third clamp connected to the second horizontal bar.

The arrangement for servicing high tension towers and/or lines in accordance with the invention comprises the tubular support structure described above and a counterweight adapted to be arranged on an opposite side of the helicopter from the tubular support structure. The counterweight comprises a box adapted to be fixed to a landing gear of the helicopter and housing different weights.

BRIEF DESCRIPTION OF THE DRAWINGS

A more complete appreciation of the present invention and many of the attendant advantages thereof will be readily understood by reference to the following detailed description when considered in connection with the accompanying drawings in which:

FIG. 3 is a side view of the chair-cage in accordance with the invention; and

FIG. 4 is a bottom view the chair-cage in accordance with the invention.

DETAILED DESCRIPTION OF THE PREFERRED EMBODIMENTS

Figure 1:
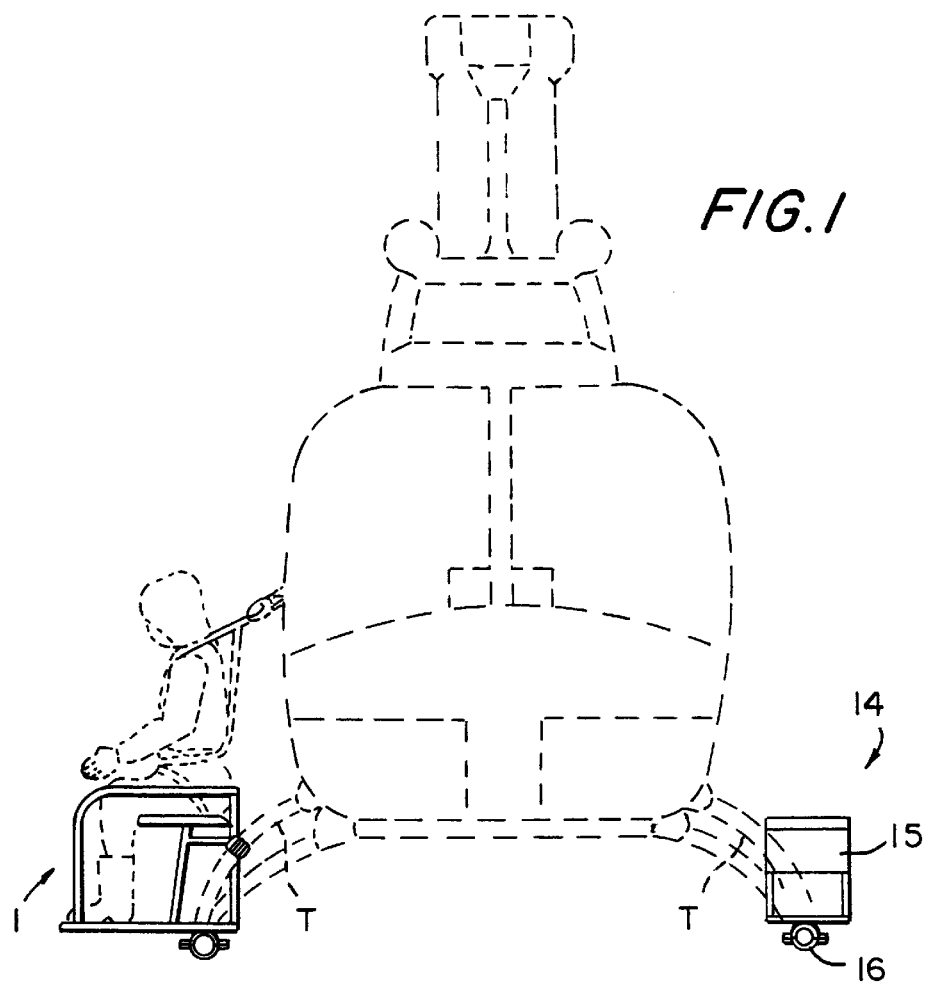
FIG. 1 is a front view of a helicopter including a chair-cage in accordance with the invention mounted to the landing gear thereof and at the opposite side, an appropriate counterweight fixed to the landing gear, both of which do not interfere with the normal and necessary movements of the landing gear.
Figure 2:
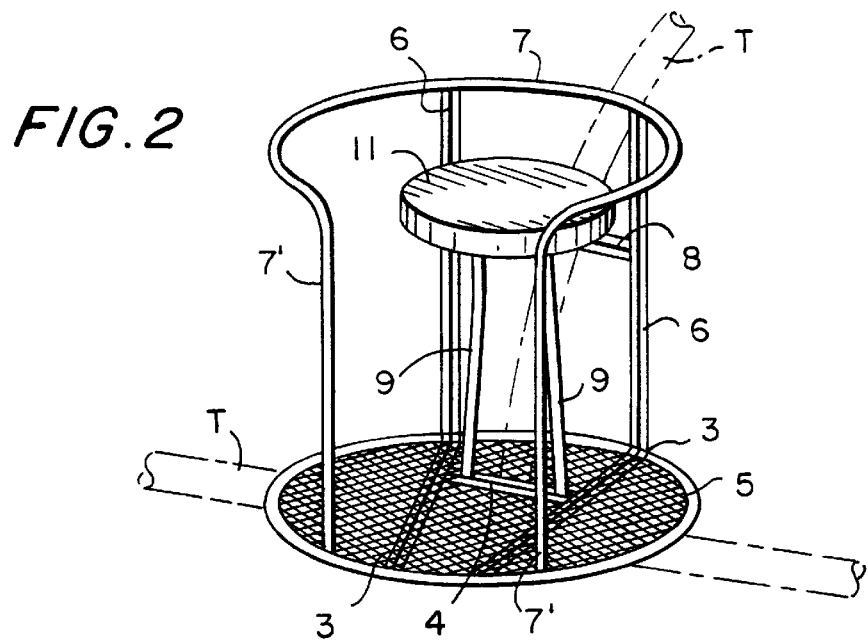
FIG. 2 is a perspective view of the chair-cage in accordance with the invention.

Referring to the accompanying drawings wherein like reference characters designate identical or corresponding parts throughout the several views, a chair-cage adapted to be coupled to a helicopter for use in construction and maintenance of high tension electricity towers and/or lines includes a tubular support structure 1 which comprise a substantially semi-circular horizontal tube 2 having an open portion at a rear of the chair-cage defined by its two ends, two elongate, horizontal support bars 3 connected to the tube 2 and which extend between one side of the tube 2 and a respective end of the tube 2 on the opposite side and are arranged in an oblique manner with respect to one other, and an elongate, horizontal crossbar 4 connected to each of the support bars 3 to thereby couple the support bars 3 to one another. An expanded veneer or mesh 5 extends over the tube 2, support bars 3 and crossbar 4 and forms a floor of the cage and contributes to the rigidity of the tubular support structure 1.

Elongate, vertical bars 6 are arranged substantially at the coupling location of the support bars 3 to the tube 2, i.e., at the rear of the chair-cage, and extend upward. The upper end of the vertical bars 6 is connected to a second horizontal tube 7 having a semi-circular shape and which forms a protection bow circled to the operator. To this end, the tube 7 has front portions orthogonal and oriented downward thereby delimiting vertical intervals 7' distant from one another so as to define an opening therebetween. The tube 7 is connected to the horizontal tube 2 in the vicinity of the attachment location of the support bars 3 to the tube 2.

An elongate brace and support horizontal bar 8 is connected to the vertical bars 6 at a middle location along the height of the bars 6 and serves to couple the vertical bars 6 together.

Two additional elongate, vertical bars 9 are connected to the horizontal crossbar 4 in the vicinity of a respective attachment location of the horizontal crossbar 4 to the horizontal support bars 3, i.e., one vertical bar 9 is arranged close to each end of the crossbar 4. Vertical bars 9 are slightly inclined toward one another. A respective elongate, horizontal bar 10 is connected to each vertical bar 9 and to the horizontal bar 8. A stool 11 is mounted at the meeting points between the vertical bars 9 and horizontal bars 10, i.e., above the locations at which the horizontal bars 10 are attached to the vertical bars 9, and serves as a seat for the operator.

The above-described chair-cage is fixed to the landing gear T of a helicopter by suitable attachment means such as clamps 12,13 arranged in three different locations. Clamps 12 are fixed to the tubular structure 1 at the attachment location between the support bars 3 and the crossbar 4. Clamp 13 is fixed to the tubular structure 1 in a middle point of the brace and support horizontal bar 8 (FIGS. 3 and 4).

Although the chair-cage described above constitutes an independent invention, in use, a counterweight 14 is often necessary at the opposite side of the helicopter to balance the chair-cage and operator. Counterweight 14 comprise a box 15 appropriately fixed to the landing gear T by attachment means such as clamps 16 without interference with the normal and necessary movements of the landing gear T. Box 15 houses different weights which enable balancing of the helicopter according to the operator's weight.

The structure of the chair-cage is electrically connected to the helicopter by a conductive wire (not shown).

In operation, to perform construction and maintenance servicing of the towers and high tension lines (e.g., installation or substitution of the wire's signal spheres for air worthiness), only the helicopter pilot and an operator participate in the actual operation. The operator is situated inside the chair-cage and secured to the helicopter through a safety belt. Both the pilot and the operator wear clothes, gloves, stockings and boots which are electrically conductive. The operator stays in permanent contact with the pilot, and the pilot in turn, stays in contact with the support team on the ground by radio. The support team may be situated at an operation base established at a location close to the place where the services will be done. The support team maintains the supply equipment, tools, helicopter's fuel, etc.

Once the chair-cage is installed in the helicopter, with the counterweight at the opposite side and the operator sitting on the stool 11, the helicopter takes off. The helicopter approaches the high tension tower or line to be repaired at an angle between about 15° to about 30°, and the operator then equalizes the helicopter's and the line's potential by means of a conductive cane. The operator then provides a pre-connection through a clamp and thereafter proceeds with the definitive connection of the helicopter and the line, equalizing the potential after he removes the pre-connection cane. Once the potential is equalized between the line, the chair-cage, the operator and the helicopter, the operator does the maintenance services in an absolutely safe way. Once the services are finished, the operator re-connects the pre-connection cane to the line, removes the connection clamp and, finally, removes the pre-connection so that the helicopter is free to move away from the line and back to the operation base.

The chair-cage is designed to work like "Faraday's Cage". According to the technical knowledge associated with "Faraday's Cage" and following Faraday's experience, it is recognized that electricity is distributed all over the periphery of a conductor, i.e., an electric field never penetrates inside a space completely wrapped by a conductor. As such, the operator receives double protection since when the helicopter is approaching the energized line and contacts the wire, the chair and the helicopter are at the same potential and, the operator, located in the middle of the chair cage, does not stay under an electric field effect. Moreover, when the operator touches the energized wire, it must receive the electric field's effects but, because he's protected by conductive clothes, it also works like a "Faraday's Cage" affording full and safe protection to the operator.

Since the chair-cage supplied by an opening oriented to the high tension line, defined by the vertical intervals 7' of the horizontal tube 7, the operator may incline his body out of the cage according to his needs in order to do the services better than with other devices. Moreover, the operator can go in or out of the chair cage easily through the opening, and is able to transfer himself to the high tension wires using the appropriate equipment for his unbinding from those wires. With the chair cage, the operator can work standing or sitting on the stool 11, according with his own conformity and/or necessity. Since the chair-cage is easy to construct, its fabrication is facilitated and its cost is relatively low.

All these advantages are true improvements, which brings more uses of the techniques of performing construction and maintenance services in towers and high tension lines with the use of helicopters.

The examples provided above are not meant to be exclusive. Many other variations of the present invention would be obvious to those skilled in the art, and are contemplated to be within the scope of the appended claims.

I claim:

1. A chair-cage adapted to be coupled to a helicopter and used in construction and maintenance of high tension electricity towers and/or lines, comprising
    a tubular support structure including
        a first substantially semi-circular tube,
        first horizontal support bars extending between two locations on said first tube,
        a horizontal crossbar extending between said first horizontal support bars for connecting said first horizontal support bars,
        a veneer extending over said first tube, said first horizontal support bars and said horizontal crossbar,
        first vertical bars, each extending from an edge of a respective one of said first horizontal support bars,
        a second substantially semi-circular tube spaced from said first tube and shaped to form a protection bow, said second tube having front portions oriented downward toward said first tube and front edges on said front portions connected to said first tube,
        a second horizontal bar connected to and extending between said first vertical bars,
        second vertical bars, each extending from an end region of said horizontal crossbar,
        third horizontal bars, each connected to a respective one of said first vertical bars and a respective one of said second vertical bars, and
        a stool mounted above locations at which said second vertical bars and said third horizontal bars are connected to one another.

2. The chair-cage of claim 1, further comprising attachment means arranged on said tubular support structure for attaching said tubular support structure to the helicopter.

3. The chair-cage of claim 2, wherein said attachment means are structured and arranged to attach said tubular support structure to a landing gear of the helicopter.

4. The chair-cage of claim 3, wherein said attachment means comprise clamps.

5. The chair-cage of claim 4, wherein said clamps comprise first and second clamps connected to a respective one of said first horizontal support bars and a third clamp connected to said second horizontal bar.

6. An arrangement for servicing high tension towers and/or lines, comprising
    a tubular support structure adapted to be coupled to a helicopter including
        a first substantially semi-circular tube,
        first horizontal support bars extending between two locations on said first tube,
        a horizontal crossbar extending between said first horizontal support bars for connecting said first horizontal support bars,
        a veneer extending over said first tube, said first horizontal support bars and said horizontal crossbar,
        first vertical bars, each extending from an edge of a respective one of said first horizontal support bars,
        a second substantially semi-circular tube spaced from said first tube and shaped to form a protection bow, said second tube having front portions oriented downward toward said first tube and front edges on said front portions connected to said first tube,
        a second horizontal bar connected to and extending between said first vertical bars, second vertical bars, each extending from an end region of said horizontal crossbar, third horizontal bars, each connected to a respective one of said first vertical bars and a respective one of said second vertical bars, and a stool mounted above locations at which said second vertical bars and said third horizontal bars are connected to one another; and a counterweight adapted to be arranged on an opposite side of the helicopter from said tubular support structure.

7. The arrangement of claim 6, wherein said counterweight comprises a box adapted to be fixed to a landing gear of the helicopter and housing different weights.

8. The arrangement of claim 6, further comprising attachment means arranged on said tubular support structure for attaching said tubular support structure to the helicopter.

9. The arrangement of claim 8, wherein said attachment means are structured and arranged to attach said tubular support structure to a landing gear of the helicopter.

10. The arrangement of claim 9, wherein said attachment means comprise clamps.

11. The arrangement of claim 10, wherein said clamps comprise first and second clamps connected to a respective one of said first horizontal support bars and a third clamp connected to said second horizontal bar.

* * * * *